June 24, 1930.　　J. T. ATWOOD　　1,765,394
SEAT BACK MOUNTING
Filed Nov. 12, 1926
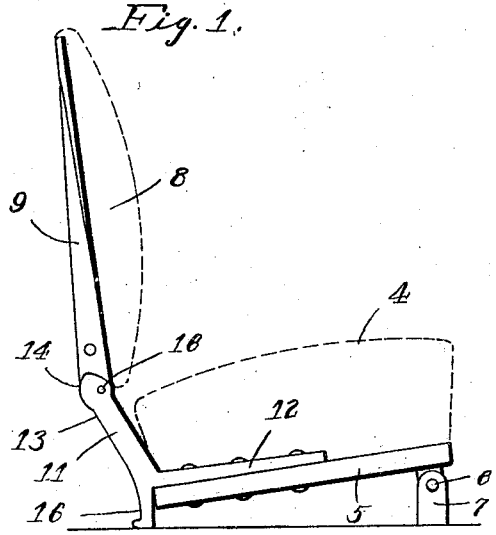
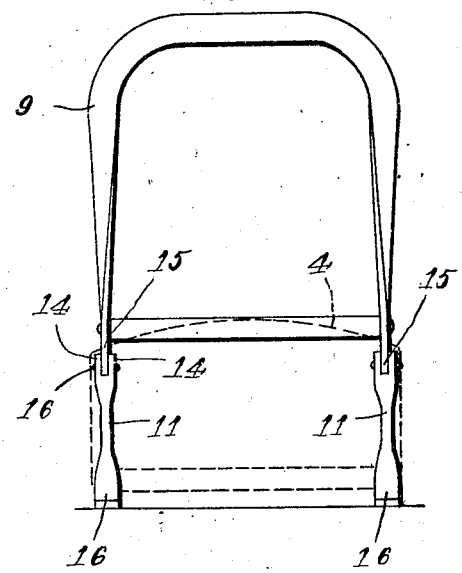
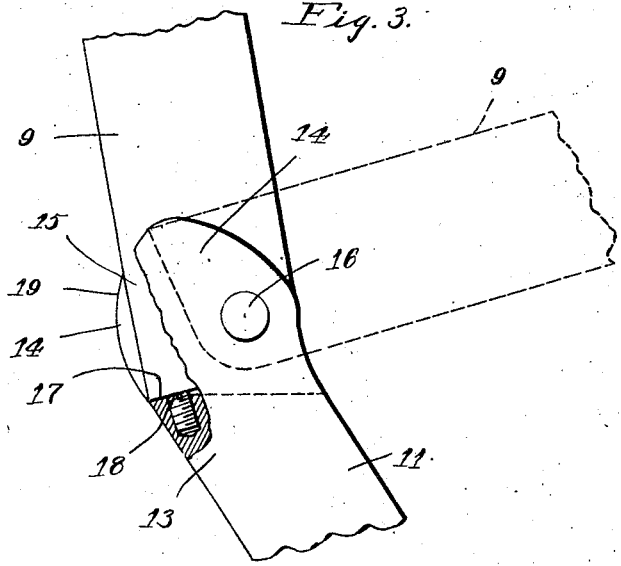
Inventor
James T. Atwood
By Wilson & McCanna
Attys Patented June 24, 1930

1,765,394

UNITED STATES PATENT OFFICE

JAMES T. ATWOOD, OF ROCKFORD, ILLINOIS

SEAT-BACK MOUNTING

Application filed November 12, 1926. Serial No. 147,895.

This invention relates to the mounting of a pivoted seat back such as is used on a folding automobile seat and has for its chief object the provision of an improved mounting, described more fully hereinafter, characterized by a joint or knuckle comprising supporting bracket parts having upstanding bifurcated ends, the separated ears of which are shaped to cover and guard the seat back parts which are pivoted therebetween. Another object is to so construct and arrange these parts as to provide a comparatively long lever-arm stop shoulder for holding the pivoted seat back in the upright position and resisting the back pressure. The purpose of the foregoing features is to provide a strong and durable construction which will prevent the admission of objects between said ears and thereby prevent injury to such objects or obstruction to the operation of the seat back.

A further object is to provide as a new article of manufacture a one-piece seat bracket comprising a seat attaching part, a seat back supporting part, and a seat supporting leg, whereby to simplify and improve a seat structure of the character in mind.

Still another object is to provide an improved seat back mounting of the character described which will serve in a practical and satisfactory manner the purposes intended and which may be manufactured economically.

Referring to the drawing—

Figure 1 is a side elevation of a seat back mounting embodying my invention;

Fig. 2 is a rear view thereof; and

Fig. 3 is an enlarged fragmentary side elevation of the joint or knuckle.

The seat shown is of a folding type especially designed for use in automobiles. The seat proper 4 is supported on a seat bottom 5 which is pivotally mounted at 6 on a suitable support 7, whereby when the seat back, which will be presently described, is folded down the entire seat structure may be swung upwardly on the pivot 6 to an out of the way position.

The seat back 8 is attached to a suitable frame 9 in turn pivotally mounted on a pair of supporting brackets 11 which are attached to the seat bottom 5, these reference numerals being applied generally. One phase of my invention is the integral construction of the brackets 11, each being shaped to provide an elongated seat attaching part 12 which may be riveted or otherwise fastened to the seat bottom 5, an upstanding seat back supporting part 13 having a bifurcated upper end upon and between the ears 14 of which the seat back parts 15 are pivoted, and a leg 16 at the juncture of the parts 12 and 13 adapted to support the seat at the proper inclination for use. This gives a strong and durable construction which is exceptionally simple and serves to maintain the seat and seat back at all times in the desired cooperative relation and to properly support the seat in the operative position.

Another phase of my invention is found in the pivotal mounting or knuckle connecting the seat back and its supporting parts. The latter comprises a bracket structure, in this instance the two individual brackets 11, the upper ends of which are bifurcated to provide the separated ears 14 upon and between which the parts 15 are pivotally mounted on pins 16. The seat back parts 15 are, in this instance, the ends of a strap iron U-frame which constitutes the main frame for the seat back. Said parts 15 each have a flat end 17 providing a stop shoulder adapted to strike against an abutment 18 on the bracket arm 13. By arranging the pivot pin 16 close to the forward side of the bracket 13 a comparatively long lever arm is provided between the center of the pin 16 and the extremity of the stop shoulder 17 for effectively resisting the pressure against the back 8. In this embodiment the abutment 18 is adjustable for varying the angle of the back, the abutment being in the form of a screw threaded into the bracket part 13. The ears 14 are shaped to cover the stop shoulder corner of the part 15 in any position of the latter; and to this end said ears are formed so that their rear edge 19 is arcuate, substantially concentric with the pivot pin 16. In Fig. 3, the seat back frame 9 is shown in dotted lines swung forwardly to its folded position into which it will be observed that the stop shoulder corner of the part 15 is covered at its sides by the ears 14, it being apparent that by reason of the special formation of said ears this condition prevails at any position of the seat back. As a result of the foregoing construction the ears 14 on each supporting bracket serve to prevent the admission of objects between the stop shoulder and its complemental abutment, thereby preventing injury to such objects or obstruction to the operation of the seat back.

I claim:

A seat back mounting especially adapted for folding seats of motor vehicles comprising a bracket structure having two upstanding bracket arms each bifurcated at its upper end, a seat back having parts fitting between the separated ears of said bifurcated ends and each having a stop shoulder, a pivot pin connecting each seat back part to its complemental ears and located adjacent to the front of the bracket ears so as to allow a comparatively long lever arm for its stop shoulder, said ears each being extended upwardly relative to the pivots sufficiently to cover the otherwise exposed adjacent rear corner of its stop shoulder part in any position of the seat back, each bracket part having an abutment between the ears thereof against which its associated stop shoulder is adapted to strike in the upright operative position of the seat, said ears serving to prevent admission of objects between the stop shoulders and abutments, thereby preventing injury to such objects or obstruction to the operation of the seat back.

In witness of the foregoing I affix my signature.

JAMES T. ATWOOD.